United States Patent
Appia et al.

(10) Patent No.: US 11,303,806 B2
(45) Date of Patent: Apr. 12, 2022

(54) THREE DIMENSIONAL RENDERING FOR SURROUND VIEW USING PREDETERMINED VIEWPOINT LOOKUP TABLES

(71) Applicant: TEXAS INSTRUMENTS INCORPORATED, Dallas, TX (US)

(72) Inventors: Vikram VijayanBabu Appia, Dallas, TX (US); Sujith Shivalingappa, Bangalore (IN); Brijesh Rameshbhai Jadav, Bangalore (IN); Hemant Hariyani, Plano, TX (US); Shashank Dabral, Allen, TX (US); Mayank Mangla, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/720,528

(22) Filed: Dec. 19, 2019

(65) Prior Publication Data
US 2020/0195846 A1 Jun. 18, 2020

Related U.S. Application Data

(63) Continuation of application No. 15/298,214, filed on Oct. 19, 2016, now Pat. No. 10,523,865.
(Continued)

(51) Int. Cl.
*H04N 5/232* (2006.01)
*B60R 1/00* (2006.01)
(Continued)

(52) U.S. Cl.
CPC .......... *H04N 5/23238* (2013.01); *B60R 1/00* (2013.01); *G06T 3/0093* (2013.01); *G06T 15/06* (2013.01);
(Continued)

(58) Field of Classification Search
None
See application file for complete search history.

(56) References Cited

U.S. PATENT DOCUMENTS 8,204,299 B2 6/2012 Arcas et al.
2002/0180727 A1 12/2002 Guckenberger et al.
(Continued)

FOREIGN PATENT DOCUMENTS

| EP | 1 179 958 | 2/2002 |
|----|-----------|--------|
| KR | 101209072 | 12/2011 |

(Continued)

OTHER PUBLICATIONS

Vikram Appia, et al., "Surround View Camera System for ADAS on TI's TDAx SoCs", Texas Instruments Inc., SPRY270A, Oct. 2015, pp. 1-18.
(Continued)

*Primary Examiner* — Talha M Nawaz
(74) *Attorney, Agent, or Firm* — Ebby Abraham; Charles A. Brill; Frank D. Cimino (57) ABSTRACT

A method for displaying a surround view on a single display screen is disclosed. A plurality of image frames for a particular time may be received from a corresponding plurality of cameras. A viewpoint warp map corresponding to a predetermined first virtual viewpoint may be selected, wherein the viewpoint warp map defines a source pixel location in the plurality of image frames for each output pixel location in the display screen. The warp map was predetermined offline and stored for later use. An output image is synthesized for the display screen by selecting pixel data for each pixel of the output image from the plurality of image frames in accordance with the viewpoint warp map. The synthesized image is then displayed on a display screen.

20 Claims, 9 Drawing Sheets

Related U.S. Application Data (60) Provisional application No. 62/275,631, filed on Jan. 6, 2016.

(51) Int. Cl.
   *G06T 3/00* (2006.01)
   *H04N 7/18* (2006.01)
   *H04N 5/247* (2006.01)
   *G06T 15/20* (2011.01)
   *G06T 15/06* (2011.01)
   *H04N 5/357* (2011.01)

(52) U.S. Cl.
   CPC ........... *G06T 15/205* (2013.01); *H04N 5/247* (2013.01); *H04N 5/3572* (2013.01); *H04N 7/181* (2013.01); *B60R 2300/105* (2013.01); *B60R 2300/202* (2013.01); *B60R 2300/306* (2013.01); *B60R 2300/802* (2013.01)

(56) References Cited

U.S. PATENT DOCUMENTS

| | | | |
|---|---|---|---|
| 2006/0120620 A1* | 6/2006 | Bassi | G06T 3/0093 382/276 |
| 2009/0213112 A1 | 8/2009 | Zhu et al. | |
| 2009/0310851 A1 | 12/2009 | Arcas et al. | |
| 2011/0074916 A1 | 3/2011 | Demirdjian | |
| 2012/0069188 A1 | 3/2012 | Ohno et al. | |
| 2014/0098229 A1 | 4/2014 | Lu et al. | |
| 2014/0104424 A1 | 4/2014 | Zhang et al. | |
| 2014/0114534 A1* | 4/2014 | Zhang | H04N 5/23238 701/42 |
| 2015/0175072 A1* | 6/2015 | Sabeti | G08G 1/166 348/148 |
| 2015/0254825 A1 | 9/2015 | Zhang et al. | |
| 2016/0006932 A1* | 1/2016 | Zhang | G06T 3/0093 348/222.1 |
| 2016/0291592 A1 | 10/2016 | Matthews | |
| 2016/0353019 A1* | 12/2016 | Kodama | G06T 5/006 |
| 2017/0113614 A1 | 4/2017 | Fluegel | |

FOREIGN PATENT DOCUMENTS

| | | |
|---|---|---|
| KR | 101209072 | 11/2018 |
| RU | 2010134021 | 2/2012 |

OTHER PUBLICATIONS

Vikram Appia, et al. "Feature Point Detection for On-Line Surround View Calibration", U.S. Appl. No. 62/249,031, filed Oct. 30, 2015, pp. 1-10.

Paul Bourke, "Image Warping for Projection Onto a Cylinder (including Stereoscopic)", Dec. 1, 2004, XP055614490, Retrieved From the Internet: URL:http://paulbourke.net/stereograhics/cylinder [retrieved on Aug. 22, 2013].

Hannes Estl, "Paving the Way to Self-Driving Cars with Advanced Driver Assistance Systems", Texas Instruments Incorporated, SSZY019, Aug. 2015, pp. 1-9.

Roman Staszewsk, and Hannas Estl, "Making Cars Safer Through Technology Innovation", Texas Instruments Incorporated, White Paper, SSZY009, Oct. 2013, pp. 1-8.

Buyue Zhang, et al., "A Surround View Camera Solution for Embedded Systems", 2014 IEEE Conference on Computer Vision and Pattern Recognition Workshops, Jun. 23-28, 2014, Columbus, OH, pp. 878-881.

\* cited by examiner

THREE DIMENSIONAL RENDERING FOR SURROUND VIEW USING PREDETERMINED VIEWPOINT LOOKUP TABLES

CLAIM OF PRIORITY UNDER 35 U.S.C. 119 (E) PROVISIONAL

The present application is a Continuation of application Ser. No. 15/298,214, which claims priority to and incorporates by reference U.S. Provisional Application No. 62/275,631, filed Jan. 6, 2016, entitled "3D RENDERING WITH AID OF 2D IMAGE WARP HARDWARE ACCELERATOR FOR 3D SURROUND VIEW."

FIELD OF THE INVENTION

This disclosure relates to image systems for three dimensional (3D) surround views (3D SRV), and more specifically to rendering a 3D SRV using predetermined viewpoint lookup tables.

BACKGROUND OF THE INVENTION

A new class of embedded safety systems, referred to as advanced driver assistance systems (ADAS), has been introduced into automobiles to reduce human operation error. Such systems may provide functionality such as rear-view facing cameras, electronic stability control, and vision-based pedestrian detection systems. Many of these systems rely on computer vision processing to detect objects in the field of view of one or more cameras. See, for example, "Making Cars Safer Through Technology Innovation," October 2013.

The automotive surround view camera system is an emerging automotive ADAS technology that assists the driver in parking the vehicle safely by allowing him/her to see a top-down view of the 360 degree surroundings of the vehicle. Such a system normally includes of four to six wide-angle (fish-eye lens) cameras mounted around the vehicle, each facing a different direction. From these camera inputs, a composite view of the surroundings of the vehicle is synthesized and shown to the driver in real-time during parking.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Since most visual display systems are two dimensional (2D), representation of the three dimensional (3D) world by projecting on 2D displays is very important part of rendering graphics for human visualization. Several applications render 3D graphics on 2D displays with the aid of graphics processing units (GPUs), which are special graphic cores, designed for various 3D graphics capabilities. One of many such emerging applications is 3D surround view with wide angle fish-eye lens cameras mounted on cars. A surround view camera solution may create a composite 3D surround view image from multiple fisheye lens cameras mounted around a car. Representing the 3D world from various view-points in real time is typically handled by graphics processor.

An alternative approach to rendering 3D representations on 2D displays using a 2D warp hardware accelerator with predetermined viewpoint lookup tables will be disclosed herein. This alternative approach is very suitable for 3D world representations with smooth varying surfaces. Automotive 3D Surround view is one such application with a world represented by a smooth surface. As discussed below, embodiments of the disclosed method may be applied to a 3D surround view camera solution. The technique may be applied to any application, however, that may use smooth surface rendering from multiple view points, such as medical imaging, security systems with multiple cameras, industrial applications, etc.

Figure 1:
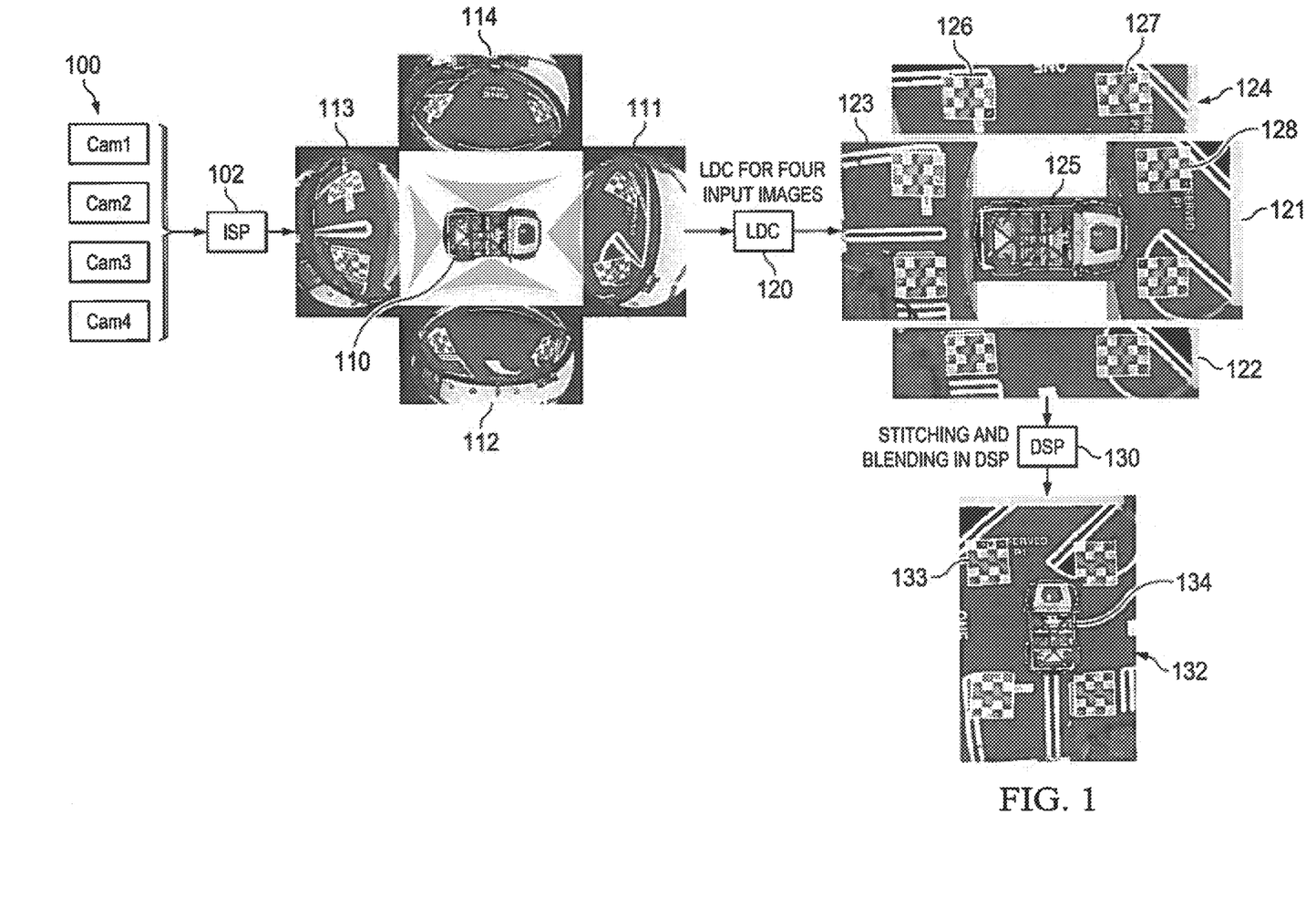
FIG. 1 is a pictorial flow diagram illustrating a process for producing a two dimensional surround view.

FIG. 1 is a pictorial flow diagram illustrating a process for producing a 2D surround view. The process for producing a 2D surround view will be described briefly before describing the more complicated process or producing a 3D surround view. 20 surround view produces a composite image from a viewpoint that appears to be located directly above the vehicle looking straight down. In essence, a virtual top view of the neighborhood around the vehicle is provided.

Automotive surround view, also called "around view," or "surround vision monitoring system," is an emerging automotive ADAS technology that provides the driver a 360-degree view of the area surrounding the vehicle. Surround view systems normally include four to six fish-eye cameras mounted around the vehicle. For example, camera set 100 includes one at the front bumper, another at the rear bumper, and one under each side mirror. Images produced by each camera may be provided to an image signal processing system (ISP) 102 that includes memory circuits for storing one or more frames of image data from each camera. Fish-eye images 111-114 captured by each camera may be conceptually arranged around a vehicle 110, for example. In this demonstration, a scale model vehicle with four cameras mounted on it is positioned in a diorama that represents a parking lot.

The general process of producing a surround view from multiple fish eye lens cameras is known, see, for example: "Surround view camera system for ADAS on TI's TDAx SoCs," Vikram Appia et al, October 2015, which is incorporated by reference herein. A basic surround view camera solution typically includes two key algorithm components: geometric alignment and composite view synthesis. Geometric alignment corrects the fish-eye distortion for input video frames and converts them to a common birds-eye perspective. The synthesis algorithm generates the composite surround view after geometric correction. To produce a seamlessly stitched surround view output, another key algorithm referred to as "photometric alignment" may be required. Photometric alignment corrects the brightness and color mismatch between adjacent views to achieve seamless stitching. Photometric correction is well known and need not be described in detail herein; see e.g.: US Patent Publication 20150254825, "METHOD, APPARATUS AND SYSTEM FOR PROCESSING A DISPLAY FROM A SURROUND VIEW CAMERA SOLUTION," which is incorporated by reference herein.

Camera system calibration is an important component of the surround view camera system. This step includes both fish-eye lens distortion correction (LDC) and perspective transformation. For fish-eye distortion correction, a radial distortion model may be used to remove fish-eye from original input frames by applying the inverse transformation of the radial distortion function. After LDC, four extrinsic calibration matrices may be estimated, one for each camera, to transform four input LDC-corrected frames so that all input views are properly registered in a single world co-ordinate system. A chart-based calibration approach may be used. The content of the chart is designed to facilitate the algorithm accurately and reliably finding and matching features. One particular chart design is illustrated at 126, 127. Other charts may also be used, see eg Provisional Patent Application 62/249,031 entitled "Feature Point Detection for on-line Surround View Calibration," filed Oct. 30, 2015 which is Incorporated by reference herein. In this example of 3D SRV calibration, the charts may be placed on flat ground, which is convenient in most automobiles. However, charts may be placed at different orientations as well if needed.

During calibration of the surround view cameras, four calibration charts may be placed around the vehicle. Each chart should be placed in the common field of view (FOV) of two adjacent cameras, i.e., every pair of the adjacent cameras should "see" one common chart. (Having one common chart in adjacent cameras is ideal, but single chart in each camera image is the minimum requirement) For example, chart image 127 and 128 are views of the same chart taken by two different cameras. After that, a frame from each camera is captured simultaneously, as illustrated by fish-eye images 111-114.

Due to different scene illumination, camera auto exposure (AE), and auto white balance (AWB), the color and brightness of the same object captured by different cameras can be quite different. As a result, the stitched composite image can have noticeable photometric difference between two adjacent views (i.e., camera input). The goal of photometric alignment for a surround view system is to match the overall brightness and color of different views such that the composite view appears as if it were taken by a single camera placed above the vehicle. To achieve that, a global color and brightness correction function is designed for each view such that the discrepancies in the overlapping regions of adjacent views are minimized.

Assuming proper geometric alignment is already applied to the input frames, a composite surround view 132 may be produced using a digital signal processor (DSP) 130, for example. The composite surround view uses data from all four input frames from the set of cameras 100. The overlapping regions are portions of the frames that come from the same physical world but are captured by two adjacent cameras, i.e., O$\{m,n\}$, where m=1, 2, 3, 4, and n=(m+1) mod 4. O$\{m,n\}$ refers to the overlapping region between view m and view n, and n is the neighboring view of view m in clockwise order. At each location in O$\{m,n\}$, there are two pixels available, i.e., the image data from view m and its spatial counterpart from view n After the camera system has been calibrated, a surround view synthesis "Synthesis" function receives input video streams from the four fish-eye cameras 100 and creates a composite 2D surround view 132. As described above, LDC module 120 may perform fish-eye correction, perspective warp, alignment, and bilinear/bi-cubic interpolation on the image frames from each of the four fish-eye cameras 100. LDC module 120 may be a hardware accelerator (HWA) module, for example. An example of a HWA LDC will be described in more detail below. DSP module 130 performs stitching and may overlay an image of a vehicle, such as vehicle image 134, on the final composite output image 132.

Synthesis creates the stitched output image using the mapping encoded in the geometric LUT. In overlapping regions of the output frame, where image data from two adjacent input frames are required, each output pixel maps to pixel locations in two input Images. In the overlapping regions, the image data from the two adjacent images may be blended or a binary decision may be performed to use data from one of the two images. In this example, the results of using the standard alpha-blending technique are shown. For example, in composite surround view 132, chart image 133 is a blended version of chart images 127 and 128 from two different cameras.

Overview of 3D SRV Functionality

Figure 2:
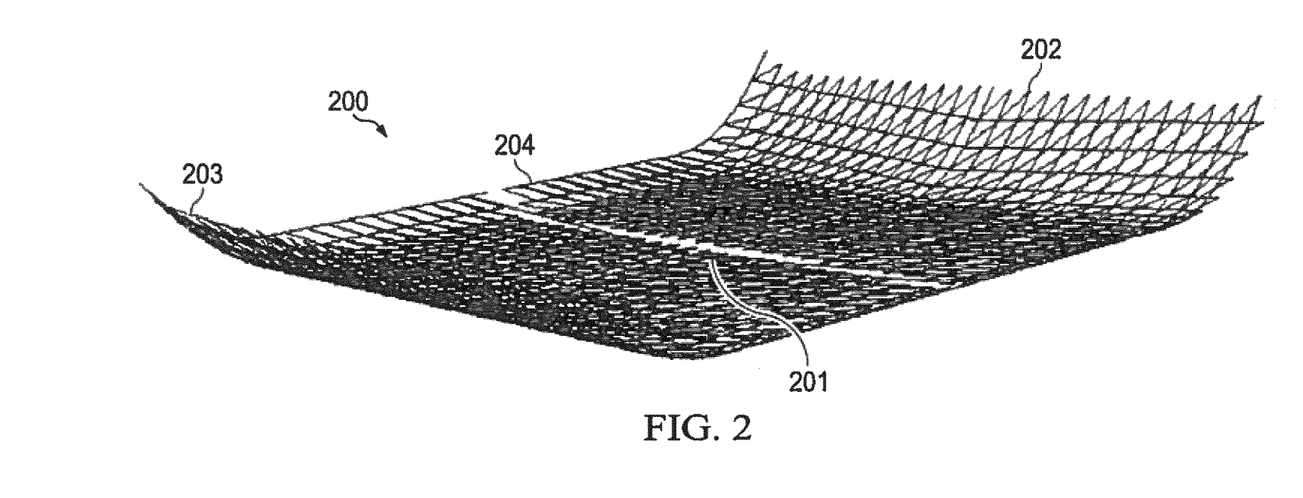
FIG. 2 is an illustration of an example three dimensional (3D) bowl mesh for use in a surround view system.

FIG. 2 is an illustration of an example three dimensional (3D) bowl mesh 200 for use in a surround view system. For a 3D SRV image, the world around the vehicle may be represented in the shape of a bowl. Due to lack of complete depth of the scene the bowl is a reasonable assumption for the shape of the world around the vehicle. This bowl can be any smooth varying surface. In this particular representation, a bowl 200 is used that is flat 201 in the regions near the car and curved away from the car, as indicated at 202, 203 for the front and back, respectively. In this example, the bowl may curve up only slightly on each side, as indicated at 204. Other bowl shapes may be used on other embodiments.

Figure 3:
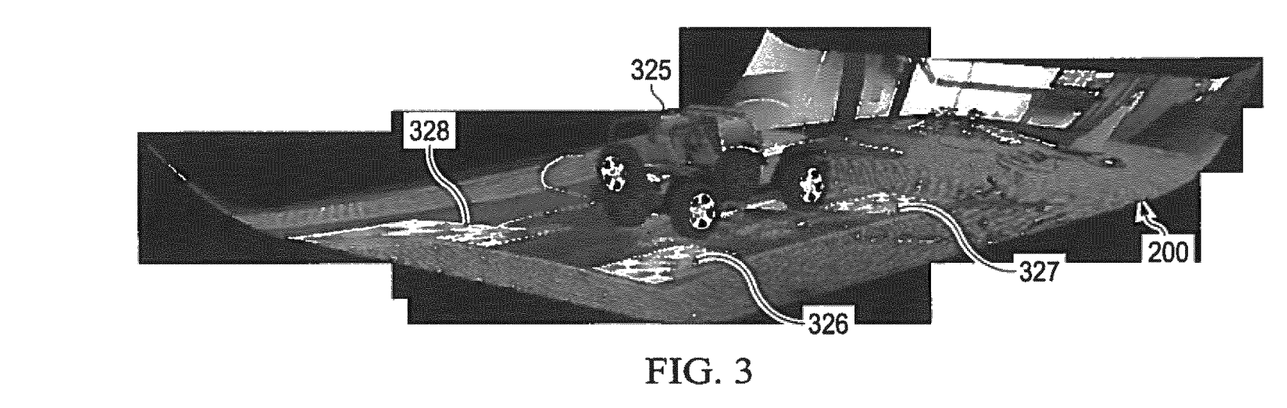
FIG. 3 illustrates an example scene overlaid on the 3D bowl mesh of FIG. 2.

FIG. 3 illustrates an example scene overlaid on the 3D bowl mesh 200 of FIG. 2. In this example, an image of a vehicle 325 is superimposed over the scene on mesh 200. Vehicle image 325 may be used to represent the position of the vehicle on which the set of cameras is mounted, for example. In this example, four calibration fields are arranged around vehicle 325; calibration fields 326, 327, and 328 are visible in this example.

Figure 4:
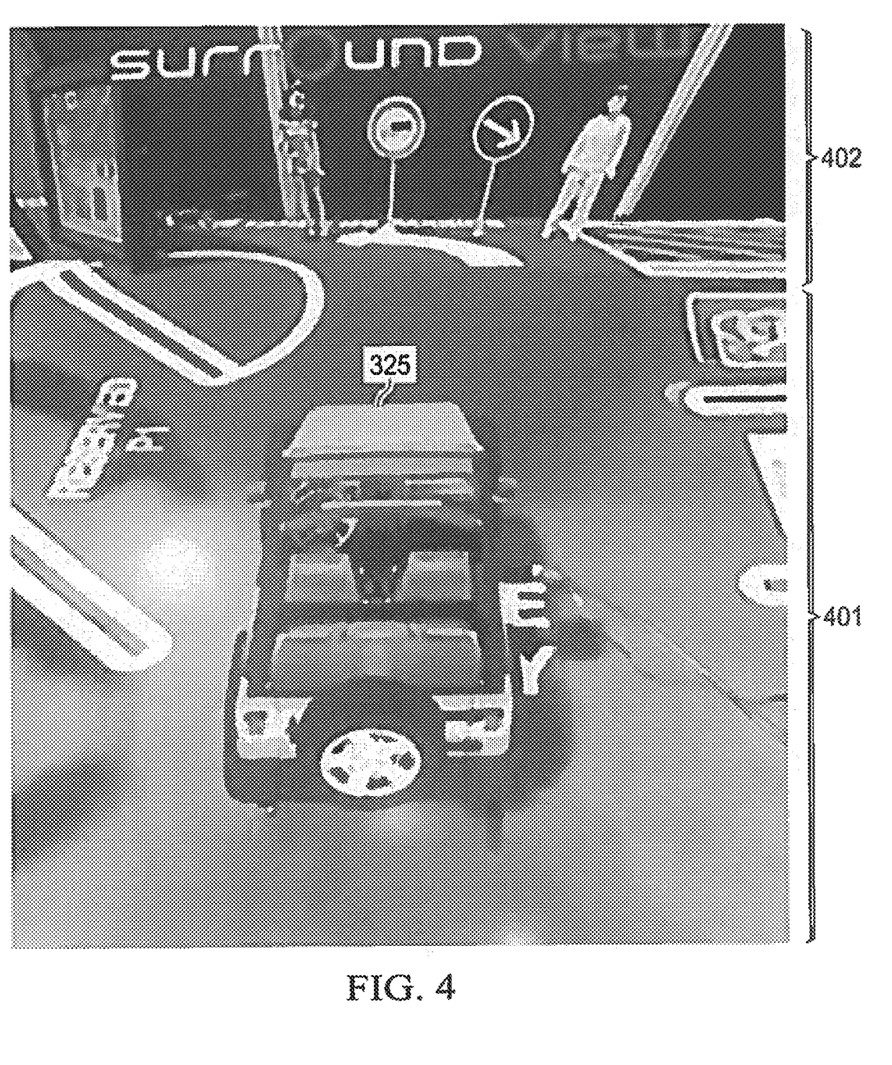
FIG. 4 illustrates a 3D surround view (SRV) image produced for a virtual viewpoint using the 3D bowl mesh of FIG. 2.

FIG. 4 illustrates a 3D surround view image produced for a virtual viewpoint using the 3D bowl mesh 200 of FIG. 2.

In this example, the virtual viewpoint is above and somewhat behind vehicle image 325 while the scale model vehicle represented by vehicle image 325 is located in the same parking lot diorama used for FIG. 1. In this example, the upper portion 402 of the image is derived from the raised portion 202 of bowl mesh 200, while the lower portion 401 is derived from the flat portion 201 of bowl mesh 200.

As will be discussed in more detail below, a set of virtual viewpoints may be predefined and then called sequentially at 30 frames per second, for example, to produce a video image in real time of the neighborhood surrounding the vehicle represented by vehicle image 325. The selection of the virtual viewpoints may be responsive to cues from the driver. For example, shifting from forward to reverse may change the viewpoint to look towards the rear of the vehicle. Turning the wheels may cause the viewpoint to swing in the direction of travel, for example. The viewpoint may swing closer to the vehicle at low speeds and swing farther from the vehicle at higher speeds, for example. In this manner, the driver of a vehicle may be provided with a real time video image that displays the neighborhood surrounding the vehicle to aid in parking the vehicle, for example.

Figure 5:
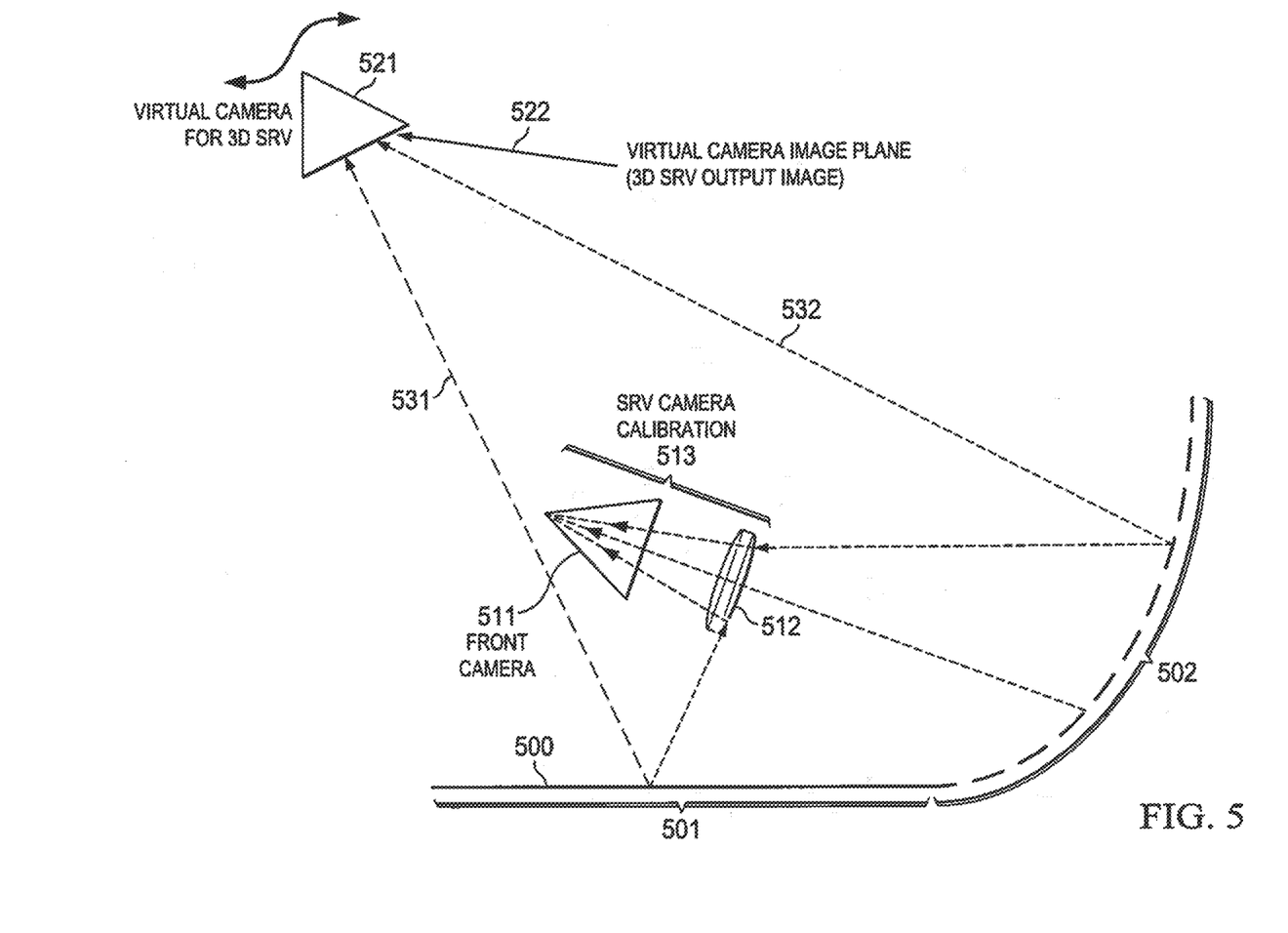
FIG. 5 illustrates a ray tracing process for forming the 3D SRV image of FIG. 4.

FIG. 5 illustrates a ray tracing process for forming the 3D SRV image of FIG. 4. This example represents a cross sectional view of a portion 500 of a bowl mesh similar to bowl mesh 200, referring back to FIG. 2. Bowl mesh 500 may include a flat portion 501 and a raised portion 502, similar to flat portion 201 and raised portion 202, referring again to FIG. 2. A camera 511 with a fish-eye lens 512 may be mounted on the front of an actual vehicle, as described in more detail above. A virtual viewpoint 521 with an image plane 522 for a 3D SRV output image may be defined to be above the actual vehicle location, for example, as described above in more detail.

In prior systems, a graphics processor may be provided that stores the entire 3D representation of the world and maps each point on the output display plane 522 by projecting the 3D points onto the display, such as the example rays illustrated at 531, 532. The initial calibration 513 of the cameras provides the mapping of world locations to pixels in the fish-eye camera to the world. The graphics processor therefore has a mapping of each world location to the display screen as well as the input camera and using this information for every location in the output display it renders a 3D Surround view output for a chosen viewpoint.

However, it is well known that ray tracing to render an image in real time requires a powerful graphics processer that adds to the cost of the image system and may consume a significant amount of power. A process will now be disclosed that divides the process of ray tracing and rendering an image into two separate operations for a set of pre-selected viewpoints. This allows the computationally intensive task of ray tracing to be performed offline and the results stored for use during real time image rendering.

Figure 6:
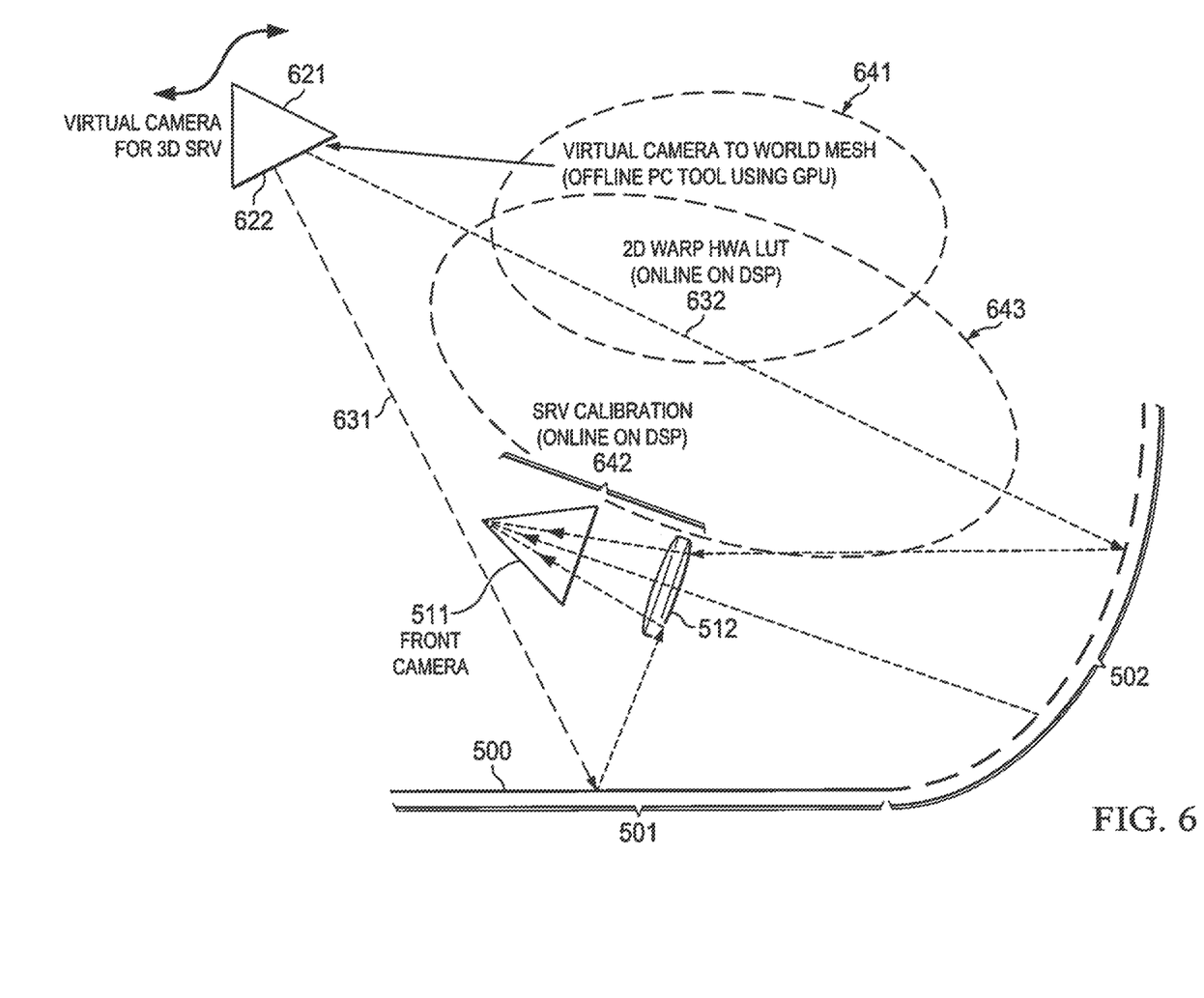
FIG. 6 illustrates how a portion of the ray tracing process of FIG. 5 may be performed in an offline manner.

FIG. 6 illustrates how a portion of the ray tracing process of FIG. 5 may be performed in an offline manner to create a set of viewpoint lookup tables (LUT). Then, during real time image rending, a process described herein may make use of a 2D warp hardware accelerator (HWA) that may be included with the lens distortion correction (LDC) processing module, such as LDC 120, referring back to FIG. 1. The 2D warp accelerator performs a mapping from output to input by mapping a block in the output image to a block in the input image by making use of the predetermined viewpoint LUTs.

This example represents a cross sectional view of a portion 500 of a bowl mesh similar to bowl mesh 200, referring back to FIG. 2. Bowl mesh 500 may include a flat portion 501 and a raised portion 502, similar to flat portion 201 and raised portion 202, referring again to FIG. 2. A camera 511 with a fish-eye lens 512 may be mounted on the front of an actual vehicle, as described in more detail above.

A virtual viewpoint 621 with an image plane 622 for a 3D SRV output image may be pre-defined to be above the actual vehicle location, for example, as described above in more detail. As discussed above, a set of viewpoints may be predefined and prepared offline.

Mapping for a location on the output image plane 622 to an input image provided by camera 511 involves offline casting a ray from a 2D location in the output image plane 622 and identifying the location that the ray intersects the 3D world. Rays 631, 632 are examples; ray 631 intersects flat portion 501 of the 3D world and ray 632 intersects the raised portion 502 of the 3D world, for example. The offline ray casting operation produces a mapping of every 20 point on the virtual view plane 622 with the X, Y, and Z coordinates of the 3D world (bowl) mesh 500. Once the location in the 3D world is identified, the camera calibration matrices generated in the auto-calibration procedure 642 may be used to map the 3D location to a 2D location in the input image from camera 511. A mapping using this approach is performed for each location in the 2D image plane 622. The 2D warp table needed by the hardware accelerator is a sub-sampled array of such mappings from output image plane 622 to input image from camera 511.

A 3D Surround view may be achieved by cycling through a series of such mappings with different virtual camera viewpoints and creating a 2D output for each mapping at video frame rates. As described above in more detail, each surround view may be a stitched image that combines four images coming from four wide angle fish-eye cameras, for example.

Since the task of ray casting is an expensive operation, the mapping may be performed offline to produce the mapped look up tables (LUT) which may then be stored for later reuse, as indicated at 641. The stored LUTs may then re-used during runtime, as indicated at 643. The calibration matrices also remain un-altered if the physical locations of the mounted cameras do not change. Thus, the virtual camera position transitions may be pre-defined and the HWA LUT mapping may be created offline and stored initially.

The pre-defined LUT generation may be further separated into two functional blocks. The virtual 2D camera output plane mapping to 3D world (bowl) mapping may be stored separately in an offline tool such as a computer. The mapping from the 3D world (bowl) to input cameras may be done on-board by a processor that is part of the image system.

This is a very effective partition of mapping functionality for two reasons. The virtual view to 3D world mapping is independent of camera orientation, therefore there is no need to re-generate this mapping for each vehicle every time the cameras move, such as during manufacture of the vehicle or during the life of the vehicle. The most expensive ray-casting operation may be performed offline.

By separating these virtual camera transitions from the camera calibration, the same mesh may be re-used for various camera configurations. For example, different car models as well as different multi-camera rendering applications, which may not necessarily be for surround view, may be accommodated with the same mesh.

A picture image of a more complex but stationary jeep/car image from the given viewpoint may also be generated offline. For each view point, one such 2D picture of the car viewed from the same virtual camera position may be extracted. The entire sequence of such mappings with the associated car image may be passed on to the online calibration procedure.

Figure 7:
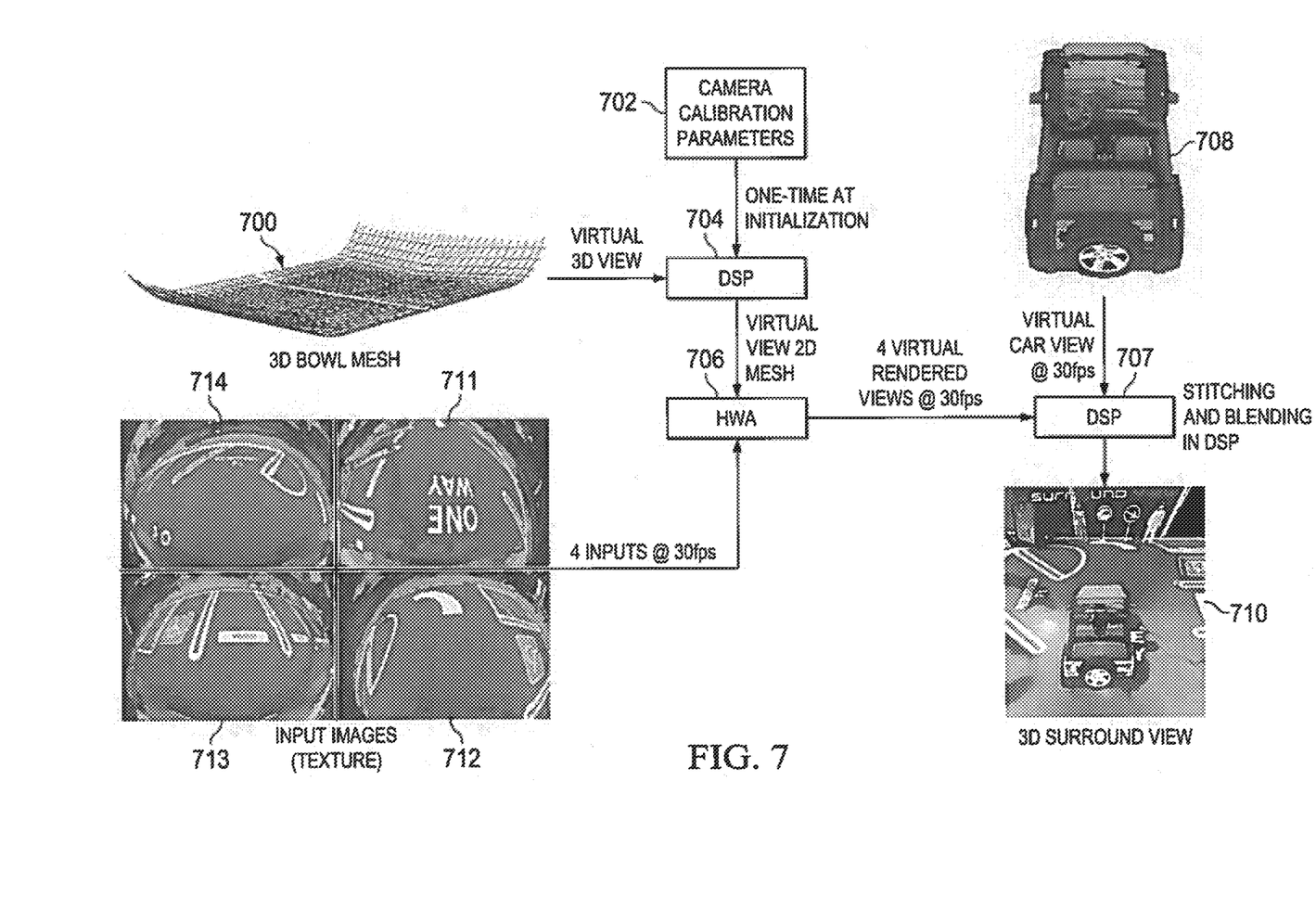
FIG. 7 is a pictorial flow diagram illustrating a process for forming a 3D SRV using predetermined viewpoint lookup tables.

FIG. 7 is a pictorial flow diagram illustrating a process for forming a 3D SRV using predetermined viewpoint lookup tables. As discussed above, mapping tables for a set of predetermined virtual viewpoints may be prepared offline and stored on the vehicle for later use. During operation of the vehicle, a 3D environment around the vehicle may be rendered from the live camera feeds received by the fish-eye cameras mounted on the periphery of the vehicle. 3D visualization of the world may be accomplished by rendering the scene from various virtual viewpoints.

As described above in more detail, a set of viewpoint lookup tables (LUT) that each contain correspondences from a virtual view 2-D location to world view mesh X,Y,Z locations may be prepared offline and stored on the vehicle. During operation of the vehicle, a particular viewpoint may be selected in response to driver input, for example. For each selected virtual viewpoint, a corresponding viewpoint LUT may be selected, as indicated at 700. The camera calibration parameters 702 may be generated by the automatic calibration procedure using calibration charts placed on the ground around the vehicle as described in more detail above. This may be done once when the vehicle is assembled, for example, and is camera setup specific.

A selected viewpoint LUT 700 and the camera calibration parameters may then be fed to a processor, such as a digital signal processor (DSP), as indicated at 704. The DSP converts each selected viewpoint LUT in combination with the camera calibration parameters to HWA LUTs for each virtual view, for each of the four fish-eye cameras. These calibrated viewpoint LUTs are then stored in a memory module that is accessible by the Warp HWA 706 and re-used sequentially by DSP 707 for stitching and blending when the vehicle is operated in live mode.

During operation of the vehicle on which the cameras are mounted, a steady stream of video at 30 fps (frames per second) Is received from the four cameras with fish eye lenses mounted on the front, back, and each side mirror of the vehicle. An example set of four images corresponding to one frame is illustrated by images 711-714.

To process each frame, warp HWA 706 accesses a calibrated viewpoint LUT from storage corresponding to the currently selected virtual viewpoint and uses the calibrated viewpoint LUT to perform a warp operation on each of the four input images to form four virtual rendered views. This process is repeated for each frame at a rate of 30 fps for this example system.

A 2D stitching and blending process, as described in more detail above, may then be performed by a DSP process 707 to form a final composite 3D SRV that may be displayed on a display screen that is visible to the driver of the vehicle. DSP process 707 may be performed by the same DSP processor that performs DSP process 704 or by a different DSP, for example. A model vehicle image that corresponds to the currently selected virtual viewpoint may also be selected from a library of preprocessed vehicle images 708 and overlaid on the composite 3D SRV to form a final 3D SRV display image is illustrated at 710.

As discussed above in more detail, the selected virtual viewpoint may be responsive to cues from the driver, such as direction and speed of vehicle motion, to form a realistic 30 fps video 3D surround view of the neighborhood around the vehicle from a virtual viewpoint outside of the vehicle.

Figure 8:
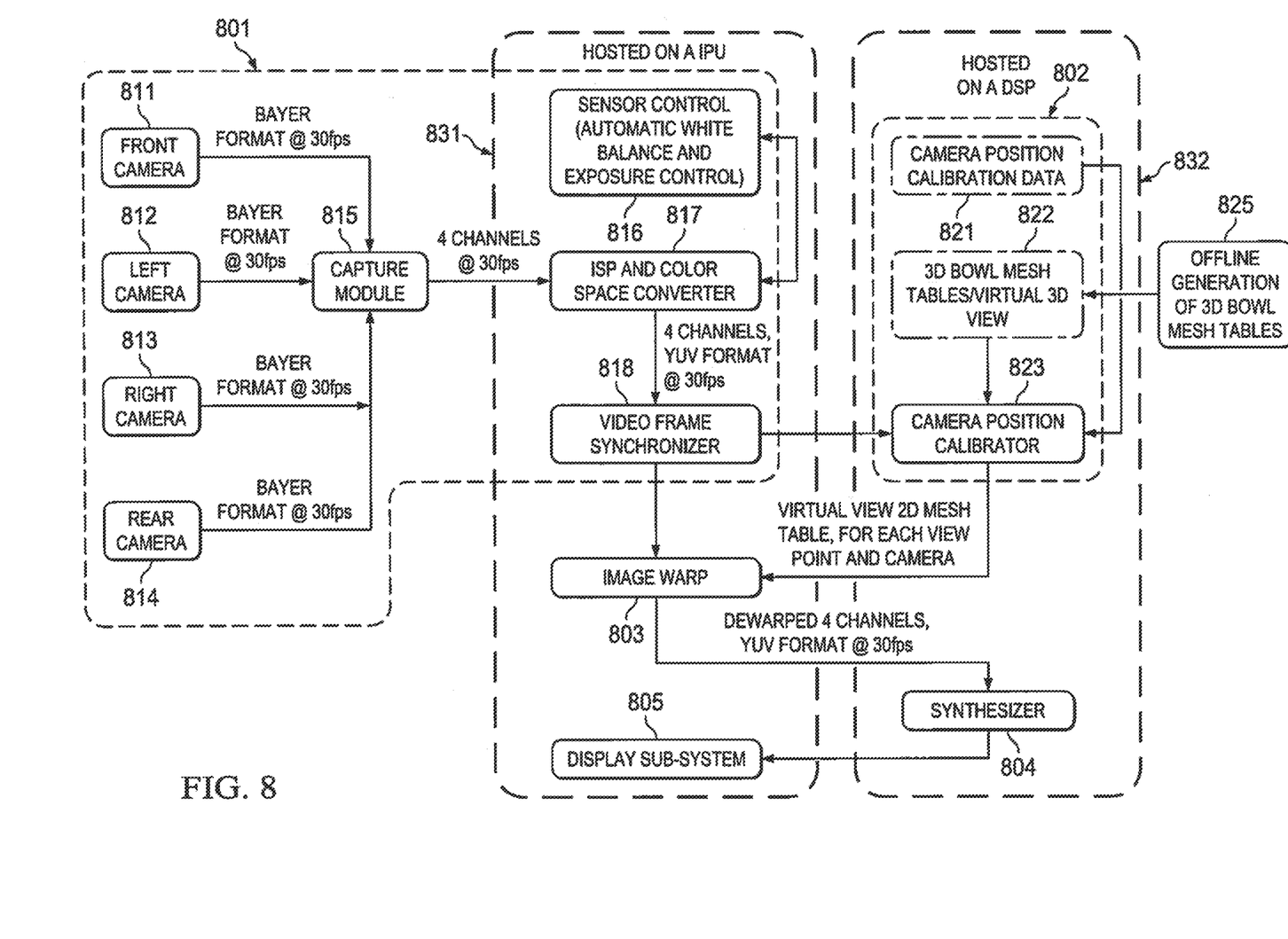
FIG. 8 is a flow chart illustrating the process of FIG. 7 in more detail.

FIG. 8 is a flow chart illustrating the process of FIG. 7 in more detail. This data flow may be classified under following sub-modules: Capture & Processing 801, Calibration 802, 2D Image Warp 803, and Synthesizer 804. Each submodule will now be described in more detail.

Capture & Processing

Capture and processing block 801 includes modules to capture video from multiple cameras, such as cameras 811-814 that are placed around the periphery of the vehicle and coupled to a capture block 815. The output of capture block 815 is referred to as "multiple channels of video" throughout this document Block 817 may perform color corrections operations (such as conversion from Bayer format to YUV420 format, color tone mapping, noise filter, gamma correction, etc.) if required, using known or later developed image processing methods. Block 816 may perform automatic exposure control of the video sensors and white balance to achieve optimal image quality using known or later developed techniques. Block 818 synchronizes all the cameras 811-814 to ensure that each frame captured from the sensor is in same time period.

In the particular implementation described herein, four cameras are used. The same principals disclosed herein may be extended to N cameras in other embodiments, where N may be greater or less than four.

Calibrator

The calibrator sub-block 802 takes the camera calibration matrix 821 generated by the auto-calibration procedure, described above in more detail, and in combination with the world to view meshes 822 generates 2D warp HWA LUTs. As described above in more detail, the world view meshes 822 may be generated offline 825 and stored for later use by the calibrator function 823.

For each predefined virtual view point, calibrator module 823 reads the associated 3D bowl mesh table 822, accounts for camera calibration parameters 821 and generates a 2D mesh lookup table for each of the four channels.

This is typically a onetime operation and done when the system is started, such as when the system is placed in a vehicle during an assembly process, for example. This process may be repeated whenever a position change is sensed for one of the cameras mounted on the vehicle. In some embodiments, the calibration process 823 may be repeated each time a vehicle is started, for example.

Image Warp

Image warp module 803 may use a Lens Distortion Correction (LDC) hardware accelerator (HWA) and a 2D mesh lookup table produced by calibrator 823 to warp input video frames provided by the capture and processing subblock 801. A 20 warping operation to render an image is much easier to perform than a 3D ray casting process used in prior systems to render an image. Thus, fisheye distortion correction and viewpoint warping may both be performed in a single operation using the predetermined viewpoint LUTs.

In this example, warp HWA 803 is a functional module that is configured to move patches of data from one frame buffer to another according to an image warping algorithm or lookup table. The general operation of a lens distortion correction module is well known and need not be described in detail herein. For example, a 2D warp HWA module is included within the TDA3x SoC available from Texas Instruments Incorporated (TI). The TDA3x SoC is based on a heterogeneous, scalable architecture that includes TI's fixed- and floating-point dual-TMS320C66x generation of DSP cores, a fully programmable Vision AccelerationPac (EVE) and dual ARM® Cortex®-M4 cores along with an image signal processor (ISP). The TDA3x SoC also integrates a host of peripherals including displays, CAN, and multi-camera interfaces (both parallel and serial) for LVDS-based surround view systems.

Image warp module 803 receives 2D a mesh table for all video channels and all viewpoints and stores them, and maintains a relation between a given virtual view point and an associated set of the 2D mesh tables along with metadata such as output size of video frame for each channel, processing parameters (such as block width/height), etc. . . . and its corresponding virtual view point.

Each time image warp module 803 receives a command to select a new viewpoint, it may determine which camera channel are needed for the selected viewpoint. This may be determined in the offline process when the viewpoint meshes are generated, for example. For example, if the SRV output is looking at the back of the vehicle to zoom into the hitch view, then the front cameras may not be needed.

Each time image warp module 803 receives a command to select a viewpoint, it retrieves the required 2D mesh lookup table for a given viewpoint, establishes required processing parameters, and associates an appropriate mesh table for each channel. The received 2D mesh table may be stored in non-volatile memory so that it is available when the vehicle is first started. In another embodiment, the 2D mesh table may be stored in volatile memory and will then require reloading each time the system is turned on.

Warp module 803 processes one video frame from each channel sequentially. Before each channel is processed, the warp HWA is configured with the associated processing parameters. Each input frame is processed as a set; a set includes one frame from each channel that is synchronized. This results in flicker/artifact free transitions when changing viewpoints at the captured frame rate.

The generated output for a given view point may be provided to the synthesizer block 804.

To minimize the system startup (boot up) time, the mesh tables may generated once and could be stored in non-volatile memory and the calibration process could be bypassed for the subsequent start/boot. On next system start/boot up, the mesh table could be read from non-volatile memory and video frames processed as described above.

Synthesizer

Synthesizer module 804 is responsible for generation of a composite video frame that includes one frame from each video channel. Depending on the virtual viewpoint the composition parameters can change. This module is similar to the synthesis block described above with regard to FIG. 1. In place of the fish-eye input images, synthesizer block 804 receives the warp HWA 803 modified output for each camera image.

The Synthesis block may stitch and blend images corresponding to adjacent cameras, as described above. The blending line location will vary based on the location of the virtual view and this information is also encoded in the offline generated world to view meshes. The synthesis block is called at the video frame rate, i.e. 30 fps and generates a stitched output image at 30 fps.

A display sub-system 805 may receive the video stream output from synthesizer 804 and display the same on a connected display unit for viewing by a driver of the vehicle, such as an LCD, Monitor, TV, etc. The system may be configured to also display meta data such detected object, pedestrians, warnings, etc.

In this example, the capture and processing sub-system 801, the warp HWA 803, and the display system 805 may be hosted by an image processing unit 831, which may be a high performance RISC (reduced instruction set core) processor and associated memory, for example. Calibrator 823 and synthesizer 804 may be hosted by a DSP (digital signal processor) 832 and associated memory, for example. In other embodiments, the various sub-systems may be hosted/controlled by different configurations of processors.

System Example

Figure 9:
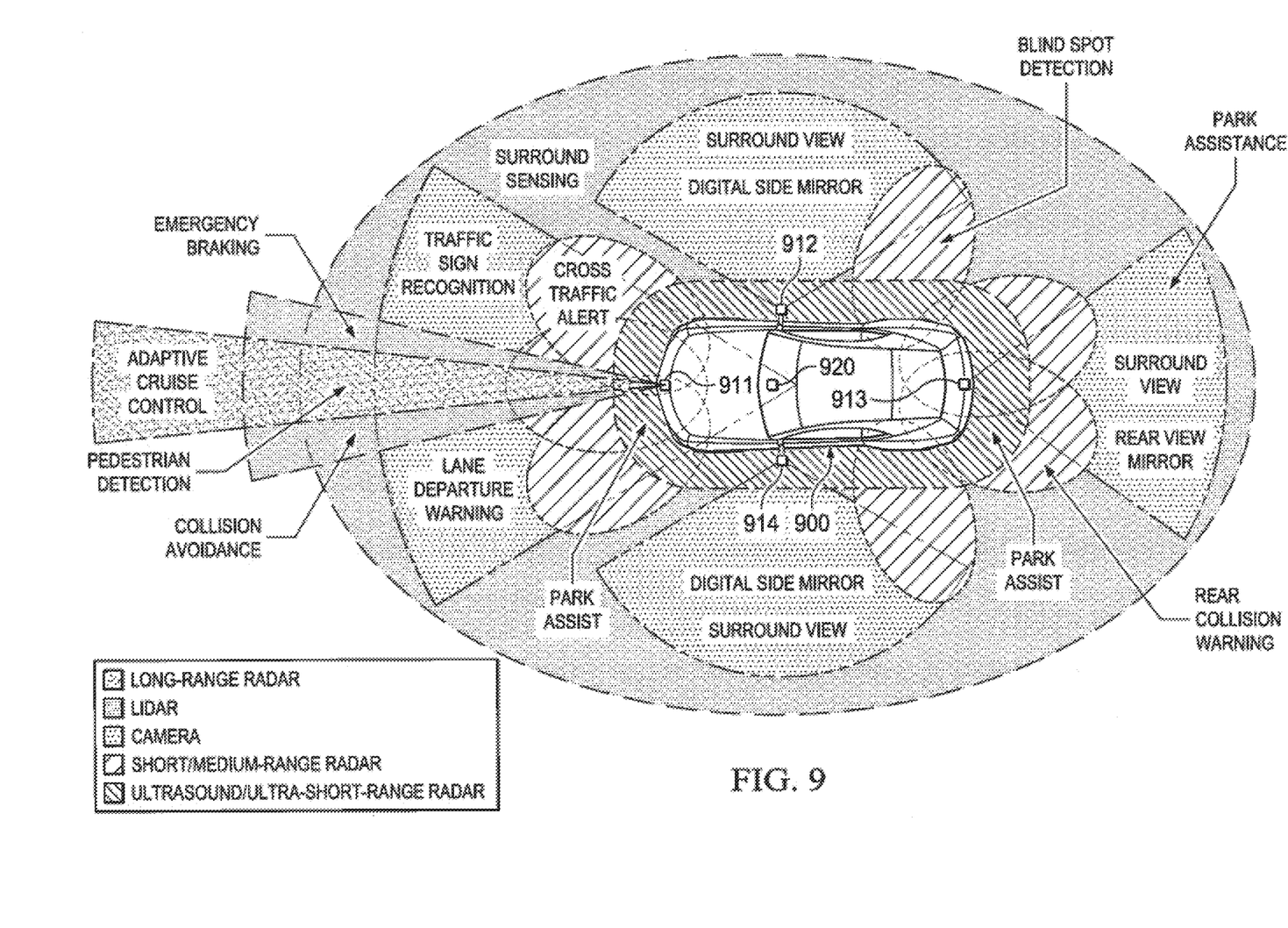
FIG. 9 is an illustration of an example vehicle that is equipped with a 3D SRV system.

FIG. 9 is an illustration of an example vehicle 900 that is equipped with a 3D SRV system as disclosed herein. In this example, four cameras are provided: front camera 911, passenger side camera 912, rear camera 913, and driver side camera 914. Side cameras 912, 914 may be mounted in the rear view mirrors, for example. Vehicle 900 includes an ADAS that utilizes cameras 911-914 to provide 3D SRV on a driver viewable display device 920, as described in more detail herein.

The ADAS 1000 may be coupled to control systems within vehicle 900, which may in turn be coupled to the engine, steering, and/or braking systems, for example. The control system may use image data processed by the image processing system to perform various types of ADAS functions.

The evolution of ADAS technology involves several areas of innovation. Two important related trends include shrinking individual components such as sensors, cameras and electronics, and integrating dedicated functions into more comprehensive systems. These trends are complementary because smaller, less expensive components are needed to build larger systems affordably. For example, the same front cameras that serve for lane-keep assistance can also provide information to detect objects in front of the car, read traffic signs or apply the brakes to avoid a crash. However, performing more complex ADAS functions requires not only input from more cameras and from other sensors such as ultrasound, LIDAR and radar, but also the fusion of data from those different sensor elements. Fusion also enables overcoming the drawbacks of individual sensor solutions and can provide some level of redundancy.

Figure 10:
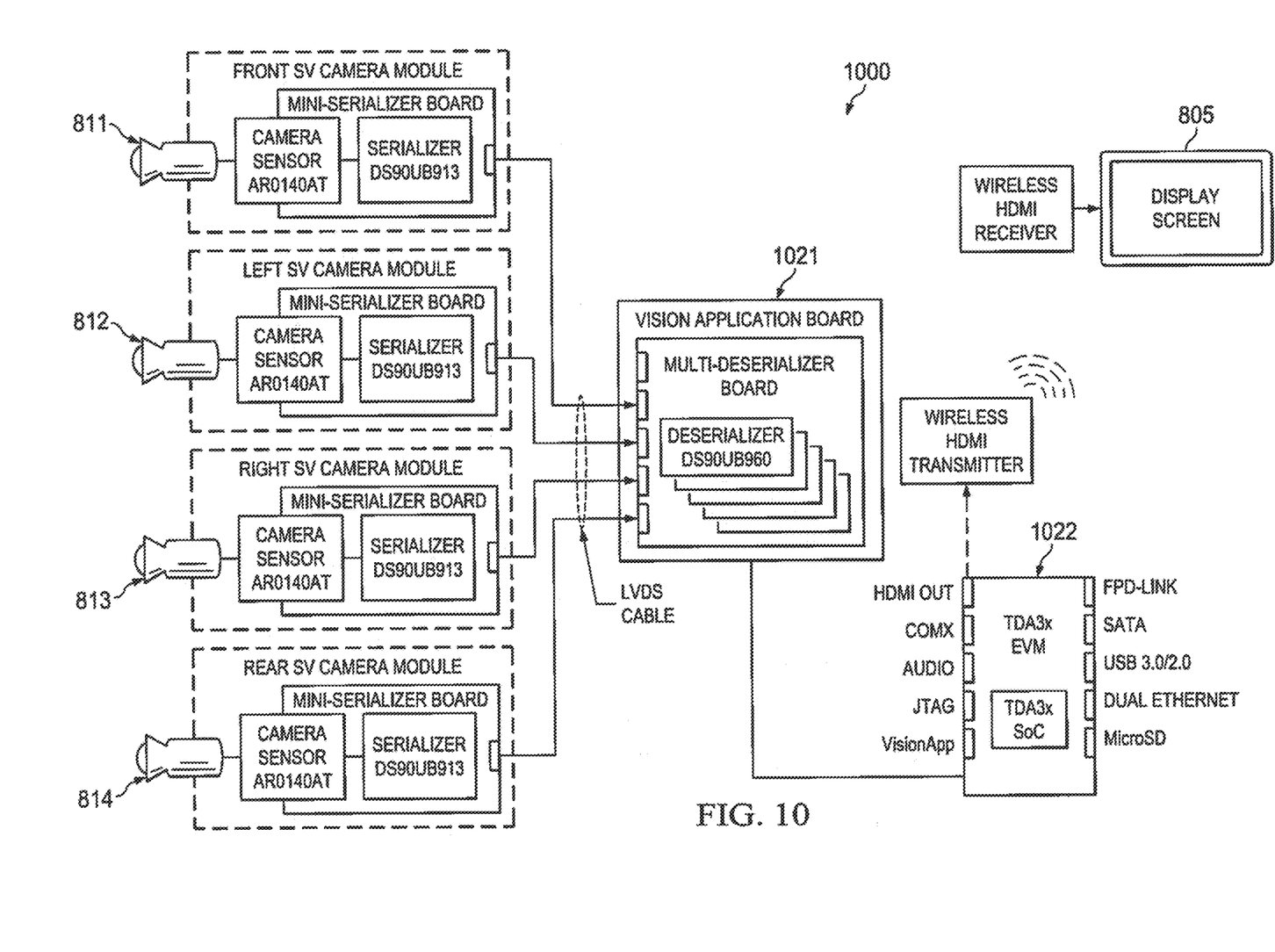
FIG. 10 is an example block diagram of an embodiment of a 3D SRV system.

FIG. 10 is an example block diagram of an embodiment of a 3D SRV system 1000 that may be included in a vehicle, such as vehicle 900, referring to FIG. 9. Display system 805 may be installed within vehicle 900, or may be remote. For a remote implementation, a wireless link may be established between the display system and the ADAS, for example, as illustrated here.

As illustrated at 1022, ADAS 1000 may be based on SoC devices such as those available from Texas Instruments Incorporated (TI), such as the TDA3x and TDA3x family of devices that may be augmented to include embodiments of the techniques disclosed herein. TI has fully integrated a set of peripherals into the TDAxx solution to simplify design and minimize space, thus facilitating sensor fusion as illustrated in FIG. 10. Communication interfaces, especially for camera-based systems like surround view and back-up camera, may benefit from TI's latest generation FPD-Link III SerDes family, such as SerDes module 1021, which helps reduce the effort to connect remote ADAS satellites to central processing modules using a single coaxial cable. Reduced wiring effort and smaller modules due to smaller connectors and highly integrated components help ensure that the ever growing number of sensor modules for ADAS is not burdening new cars with high extra cost and weight. See, for example, "Paving the way to self-driving cars with advanced driver assistance systems," Hannes Estl, August, 2015.

OTHER EMBODIMENTS

While the invention has been described with reference to illustrative embodiments, this description is not intended to be construed in a limiting sense. Various other embodiments of the invention will be apparent to persons skilled in the art upon reference to this description. For example, while a vehicle with four cameras is illustrated herein, other embodiments may include more or fewer cameras.

While video frame rates of 30 fps have been discussed above, other embodiments may use faster or slower frame rates. Faster frame rates may require more extensive processing capabilities, however.

While embodiments have been described herein in reference to ADAS, one of ordinary skill in the art will understand embodiments for computer vision applications other than ADAS may benefit from embodiments of the present disclosure, such as, for example, automotive, industrial applications, high performance computing, robotics, drones, etc.

While an automobile 900 is illustrated herein, other embodiments may be placed in other types of vehicles, such as trucks, trains, planes, drones, etc. and used to assist or fully control operation of the vehicle.

While a conventional vehicle with an onboard driver has been described herein, other embodiments may be implemented in vehicle in which the "driver" is remote from the vehicle, such as autonomous vehicles that may be controlled from a remote site.

As use herein, the term "vehicle" may also be applied to other types of devices, such as robots, industrial devices, medical devices, etc in which low cost, low power processing of images from multiple cameras to form a virtual viewpoint in real time is beneficial.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), a digital signal processor (DSP), etc. The software that executes the techniques may be initially stored in a computer-readable medium such as compact disc (CD), a diskette, a tape, a file, memory, or any other computer readable storage device and then loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for displaying a surround view on a single display screen, the method comprising:
   receiving a plurality of image frames for a particular time from a corresponding plurality of cameras mounted on a vehicle;
   selecting a first warp map corresponding to a predetermined first virtual viewpoint, wherein the predetermined first virtual viewpoint was prepared during non-runtime process and selected from a plurality of predetermined virtual viewpoints in response to an input of a driver of the vehicle, wherein the first warp map defines a source pixel location in the plurality of image frames for each output pixel location in the display screen, in which and wherein the first warp map was predetermined and stored for later use;
   synthesizing an output image for the display screen by selecting pixel data for each pixel of the output image from the plurality of image frames in accordance with the first warp map; and
   displaying the output image on the display screen.

2. The method of claim 1, further including selecting a plurality of predetermined warp maps corresponding to the plurality of predetermined virtual viewpoints in a sequential manner to produce a video sequence on the display screen.

3. The method of claim 1, wherein in which the plurality of the first warp map was produced using a plurality of test cameras in a test bed.

4. The method of claim 3, wherein the first warp map was combined with calibration parameters to account for differences in location between the plurality of cameras and corresponding ones of the plurality of test cameras during the non-runtime process.

5. The method of claim 3, further including combining a first raw warp map with calibration parameters to account for differences in location between the plurality of cameras and corresponding ones of the plurality of test cameras using a processing system mounted on the vehicle to form the first warp map.

6. The method of claim 5, wherein the first warp map is stored in a nonvolatile memory located on the vehicle.

7. The method of claim 1, further including selecting a first vehicle image and overlying it on the output image, wherein the first vehicle image was previously extracted from a model vehicle corresponding to the predetermined first virtual viewpoint and stored for later use.

8. The method of claim 1, the output image renders a separate virtual view corresponding to each of the plurality of cameras by warping each image frame to correct lens distortion using the first warp map, and wherein the method further includes stitching and blending two or more of the separate virtual views to form the output image.

9. A method for displaying a surround view on a single display screen, the method comprising:
   defining a view surface representing a three dimensional (3D) view;

positioning, on a vehicle, a plurality of test cameras in positions to capture images from the view surface;

selecting a predetermined first virtual viewpoint from a plurality of predetermined virtual viewpoints in response to an input of a driver of the vehicle;

generating a first warp map corresponding to the predetermined for a first virtual viewpoint, which includes casting a ray from a two dimensional (2D) pixel location in an output frame corresponding to the first virtual viewpoint to intersect with the view surface, and mapping that ray to a corresponding pixel location in one of the plurality of test cameras, and repeating the step of casting and mapping for each 2D pixel location of the output frame; and storing the first warp map for later use.

10. The method of claim 9, further including generating a plurality of warp maps corresponding to the plurality of virtual viewpoints and storing the plurality of warp maps for later use.

11. The method of claim 10, wherein a plurality of cameras are positioned for mounting on the vehicle, and wherein the method further includes:

extracting a plurality of vehicle images of a model vehicle from the plurality of virtual viewpoints; and storing the plurality of vehicle images for later use with corresponding ones of the plurality of warp maps.

12. The method of claim 10, further including:

storing the plurality of warp maps in a processing system on the vehicle;

determining a set of camera calibration parameters for a plurality of live cameras mounted on the vehicle to account for differences in position between the plurality of live cameras and corresponding ones of the plurality of test cameras;

updating the plurality of warp maps using the set of camera calibration parameters to form a plurality of calibrated warp maps; and storing the set of calibrated warp maps in the processing system of the vehicle for later use.

13. A three dimensional (3D) surround view system comprising:

a vehicle;

a plurality of cameras mounted on the vehicle;

a display screen mounted on the vehicle for viewing by a driver of the vehicle; and an image processing system coupled to the vehicle, the plurality of cameras, and the display screen, and configured to:

receive a plurality of image frames for a particular time from the plurality of cameras;

provide an output image to the display screen;

select a first warp map corresponding to a predetermined first virtual viewpoint, wherein the predetermined first virtual viewpoint was prepared during non-runtime process and selected from a plurality of predetermined virtual viewpoints in response to an input of a driver of the vehicle, wherein the warp map defines a source pixel location in the plurality of image frames for each output pixel location in the display screen, and wherein the first warp map was predetermined and stored for later use; and synthesize the output image for the display screen by warping each image frame to correct lens distortion using the first warp map to form a separate virtual view corresponding to each image frame.

14. The 3D surround view system of claim 13, wherein the image processing system is further configured to stitch and blend two or more of the separate virtual views to form the output image.

15. The 3D surround view system of claim 13, wherein the image processing system is further configured to select a plurality of predetermined warp maps corresponding to the plurality of predetermined virtual viewpoints in a sequential manner to produce a video sequence on the display screen.

16. The 3D surround view system of claim 13, wherein the first warp map was produced using a plurality of test cameras in a test bed.

17. The 3D surround view system of claim 16, wherein the first warp map was combined with calibration parameters to account for differences in location between the plurality of cameras and corresponding ones of the plurality of test cameras during the non-runtime setup process.

18. The 3D surround view system of claim 16, wherein the image processing system is further configured to combine a first raw warp map with calibration parameters to account for differences in location between the plurality of cameras and corresponding ones of the plurality of test cameras using a processing system mounted on the vehicle to form the first warp map.

19. The 3D surround view system of claim 18, wherein the first warp map is stored in a nonvolatile memory located on the vehicle.

20. The 3D surround view system of claim 13, wherein the image processing system is further configured to select a first vehicle image and overly it on the output image, and wherein the first vehicle image was previously extracted from a model vehicle corresponding to the first viewpoint and stored for later use.

* * * * *